Oct. 14, 1958   A. ERHARDT   2,855,657
CUTTING TOOL WITH CHIP BREAKERS
Filed Oct. 4, 1955

INVENTOR.
ANTON ERHARDT
BY
Oberlin & Limbach
ATTORNEYS.

United States Patent Office 2,855,657
Patented Oct. 14, 1958

2,855,657
CUTTING TOOL WITH CHIP BREAKERS

Anton Erhardt, Cleveland, Ohio, assignor to National Tool Company, Cleveland, Ohio, a corporation of Ohio Application October 4, 1955, Serial No. 538,432

7 Claims. (Cl. 29—103)

This invention relates as indicated to a novel cutting tool with chip breakers, and more particularly to a rotary milling cutter or the like in which the metal removing teeth have been modified for increased efficiency in operation.

It has been recognized in the past that a wide variety of metal cutting tools, including especially milling cutters, can be modified and improved by providing notches in the cutting edges effective to break the chip produced by the tool in operation and permit more rapid operation with a greater depth of cut and a reduction in power consumption. One example of this general type of tool is illustrated and described in Praeg Patent 2,278,738. Of course, cutting tools thus modified are appreciably more expensive to manufacture, and chip breaker notches have accordingly by no means been generally adopted in the trade. Cutting tools having the usual helically disposed cutting edges extending continuously from one end of the tool to the other normally take chips from the work which are as long as the cutter body, and in the larger sizes of cutter it has been found that there is considerable chatter and vibration unless the tool is operated quite slowly. In the longer tools there has also been an undesirable unbalance in the torque exerted which has not been affected by the employment of previously known chip breaker notches.

It is accordingly an important object of my invention to provide a novel rotary cutting tool having chip breaker notches in the cutting teeth thereof arranged in a novel manner for major effectiveness and to ensure a smooth cut.

Another object is to provide such chip breaker notches in a form effective to assist in balancing the torque exerted in that the endwise thrust on the tool is substantially balanced and the torque more nearly centered.

Still another object is to provide such chip breaker notches formed with edges designed for maximum cutting efficiency.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
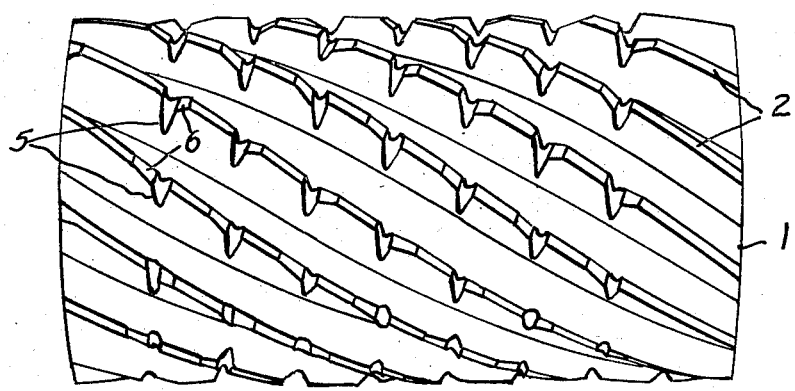
Fig. 1 is an elevational view of a typical milling cutter having cutting teeth modified by provision of my novel chip breaker notches.
Figure 3:
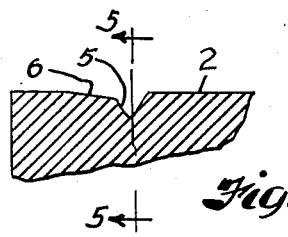
Figs. 3 and 4 are fragmentary sectional views on an enlarged scale longitudinally of alternate teeth of said cutter.
Figure 4:
Figure 2:
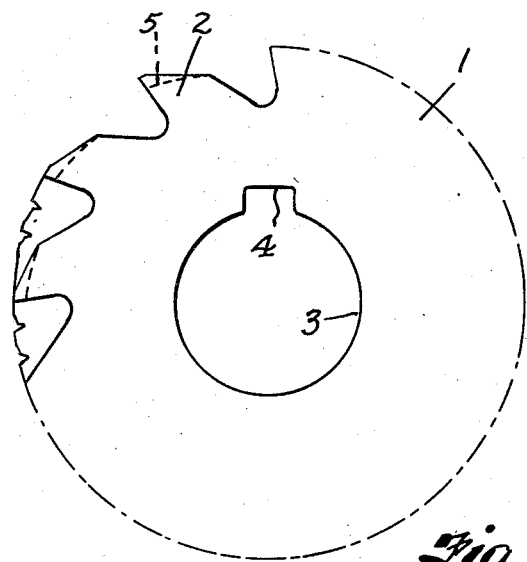
Fig. 2 is a semi-diagrammatic end elevational view of the tool of Fig. 1.

In the preferred embodiment of my invention illustrated in the drawing, a generally cylindrical steel body 1 is provided with a plurality of helically disposed parallel cutting teeth 2, such body having a central aperture 3 and groove 4 whereby it may be mounted and keyed upon an appropriate arbor or spindle. At spaced intervals along each helical tooth, notches 5 of substantial depth are ground for the purpose of interrupting the chips produced by such teeth in use. A more shallow bevel 6 merges with each such deeper notch 5, thereby providing a somewhat more gently sloping shoulder. As will be clear from an inspection of Fig. 1, such bevels 6 are formed on one side of notches 5 of one tooth and on the opposite side of such notches 5 of the next adjacent teeth so that they alternate first to one side and then to the other. I have found this latter feature to be most effective in balancing the torque of the tool in that the endwise thrust on the tool is balanced and the torque more nearly centered.

Figure 5:
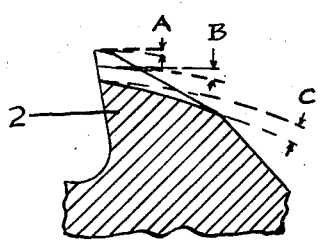
Fig. 5 is a further enlarged transverse section taken on the line 5—5 on Fig. 3 showing a cutting tooth in profile.

Referring now more particularly to Fig. 5, the cutting edge of each tooth is provided with the usual peripheral clearance A on the outer diameter of the tool. The bevels 6 are, moreover, provided with peripheral clearance B, and the notches 5 are provided with a peripheral clearance C. This is for the reason that not only do the top edges of the teeth 2 perform a metal removing function but also the chip breaking edges of notches 5 and bevels 6 to the extent determined by the depth of cut for which the tool is adjusted in the milling machine.

It will further be noted that the notches in successive teeth circumferentially of the tool are slightly axially offset, this effect preferably being obtained by grinding such notches in a low pitch helical path circumferentially of the tool. Accordingly, the chips are not broken at the same point longitudinally of the tool with resultant irregularity in the cut, but instead the effect of each notch on the surface of the work is "erased" through the action of the following teeth. This not only affords the desired cleanly milled surface, but also increases the effectiveness of the cutting operation and permits a more rapid rate of feed. I have found that a tool formed as above described may often be fed as much as six times more rapidly than a tool in which my special form of chip breaking notch is not provided.

As is apparent from the above and from an inspection of Fig. 1, when grinding the notches into a helix, the helix is arranged so that along the line of cut of the cutter there are, in perfect alignment, notches with a single beveled shoulder, the side on which each notch is beveled being alternated along the line of cut. When making a cut the beveled shoulder of the notch on one tooth will be cutting when the non-beveled shoulder of the notch on another tooth will be cutting and vice-versa. In this way the torque of the tool may be balanced and at the same time the amount of power required to run the cutter kept to a minimum.

The edges of the V-shaped notches 5 should ordinarily be inclined at approximately 60° to the top edges of the teeth 2 and the bevels 6 should ordinarily be inclined at from about 15° to about 20°. The notches and bevels will usually be of about the same extent longitudinally of the tooth. While clearance A at the top of the tooth will usually be on the order of 5° to 7°, that on the edges of notches 5 and bevels 6 will be the minimum feasible. The bevels 6 improve the chip breaking action as well as tending to balance torque. The normal depth of cut of the tool is somewhat less than the full depth of bevel 6.

Other modes of applying the principle of the invention may be employed, change being made as regards the details described, provided the features stated in any of the following claims or the equivalent of such be employed.

I therefore particularly point out and distinctly claim as my invention:

1. In a rotary milling cutter of general cylindrical form having parallel helically disposed cutting teeth on its outer periphery; a plurality of V-shaped chip breaking notches in the cutting edges of said teeth of a depth exceeding the normal depth of cut of the tool in use, said notches being arranged in a short lead helix circumferentially of the tool, each of said notches having a single beveled shoulder, said beveled shoulders of said notches of adjacent teeth lying on opposite sides of said notches, and the cutting edges of said teeth, said notches, and said shoulders being provided with cutting clearance.

2. In a rotary milling cutter of general cylindrical form having parallel helically disposed cutting teeth on its outer periphery; a plurality of V-shaped chip breaking notches in the cutting edges of said teeth of a depth exceeding the normal depth of cut of the tool in use, said notches being arranged in a short lead helix circumferentially of the tool, each of said notches having a single beveled shoulder, said beveled shoulders of said notches of adjacent teeth lying on opposite sides of said notches, and the cutting edges of said teeth, said notches, and said shoulders being provided with cutting clearance, the edges of said V-shaped notches being inclined about 60° and said shoulders being inclined about 15° to 20° to the top edges of the teeth.

3. In a rotary milling cutter of general cylindrical form having parallel helically disposed cutting teeth on its outer periphery; a plurality of V-shaped chip breaking notches in the cutting edges of said teeth of a depth exceeding the normal depth of cut of the tool in use, said notches being arranged in a short lead helix circumferentially of the tool, each of said notches having a single beveled shoulder, the beveled shoulders of said notches of adjacent teeth lying on opposite sides of said notches, said short lead helix so arranged that when there are notches along the line of cut the notches are in perfect alignment therewith and the side on which each notch is beveled alternates from shoulder to shoulder with each notch along the line of cut, and the cutting edges of said teeth, said notches, and said shoulders being provided with cutting clearance.

4. In a rotary cutting tool having a plurality of parallel cutting teeth disposed about its outer periphery; a plurality of chip breaking notches in the cutting edges of said teeth, each of said notches having a beveled shoulder on one side only.

5. The tool of claim 4 wherein said beveled shoulders of said notches of adjacent teeth lie on opposite sides of said notches.

6. The tool of claim 4 wherein said beveled shoulders of said notches of adjacent teeth lie on opposite sides of said notches, said notches being arranged in a short lead helix circumferentially of said tool so that when there are notches along the line of cut the notches are in perfect alignment therewith and the side on which each notch is beveled alternates from shoulder to shoulder with each notch along the line of cut.

7. The tool of claim 4 wherein the edges of said notches are inclined at approximately 60° to the top edges of said teeth and said beveled shoulders are inclined at approximately 15° to 20° to the top edges of said teeth.

References Cited in the file of this patent

UNITED STATES PATENTS

| | | |
|---|---|---|
| 93,212 | Lutz | Aug. 3, 1869 |
| 1,479,073 | Howard | Jan. 1, 1924 |
| 1,599,266 | Albertson | Sept. 7, 1926 |
| 2,187,744 | Kraus | Jan. 23, 1940 |
| 2,278,738 | Praeg | Apr. 7, 1942 |
| 2,390,722 | Markstrum | Dec. 11, 1945 |
| 2,683,920 | Williams | July 20, 1954 |

OTHER REFERENCES

A Treatise on Milling and Milling Machines, published by the Cincinnati Milling Machine Co., Cincinnati, Ohio, pages 67 and 68.